United States Patent
Leopold et al.

(10) Patent No.: US 6,226,493 B1
(45) Date of Patent: *May 1, 2001

(54) GEOSYNCHRONOUS SATELLITE COMMUNICATION SYSTEM AND METHOD

(75) Inventors: Raymond Joseph Leopold; Dennis Paul Diekelman, both of Tempe, AZ (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/657,846

(22) Filed: May 31, 1996

(51) Int. Cl.[7] .................................................... H04B 7/19
(52) U.S. Cl. .......................... 455/13.1; 455/427; 455/13.2
(58) Field of Search .............................. 455/13.1, 12.1, 455/13.2, 11.1, 427; 244/158 R (56) References Cited

U.S. PATENT DOCUMENTS

| 4,375,697 |   | 3/1983  | Visher      | 455/13    |
|-----------|---|---------|-------------|-----------|
| 4,502,051 | * | 2/1985  | Dondl       | 455/13.1  |
| 4,744,083 |   | 5/1988  | O'Neill et al. | 371/22 |
| 4,943,808 |   | 7/1990  | Dulck et al. | 342/356  |
| 5,006,855 |   | 4/1991  | Braff       | 342/357   |
| 5,326,054 |   | 7/1994  | Turner      | 244/158 R |
| 5,471,641 | * | 11/1995 | Dosiere et al. | 455/13.1 |
| 5,506,780 |   | 4/1996  | Montenbruck | 364/459   |
| 5,615,407 | * | 3/1997  | Barkats     | 455/13.1  |
| 5,722,042 | * | 2/1998  | Kimura et al. | 455/13.1 |
| 5,839,053 | * | 11/1998 | Bosch et al. | 455/13.1 |

FOREIGN PATENT DOCUMENTS

| 0635698 |   | 7/1994  | (DE) . |          |
|---------|---|---------|--------|----------|
| 0718987 |   | 12/1997 | (EP) . |          |
| 2134353 |   | 8/1984  | (GB) . |          |
| 0145246 | * | 1/1983  | (JP)   | 455/13.1 |

\* cited by examiner

*Primary Examiner*—Nguyen Vo
(74) *Attorney, Agent, or Firm*—Sherry J. Whitney; Frank J. Bogacz; Sharon K. Coleman (57) ABSTRACT

A geosynchronous satellite system (10) uses crosslinks (30) between geosynchronous satellites (16) which travel along the same ground path (18) or are located within a common orbital slot (32) in order to increase traffic-carrying capacity and decrease signal delays. The geosynchronous satellites (16) can have substantial angles of inclination to provide high quality coverage within a wide range of latitudes (40, 42). In addition, the orbits can be elliptical, resulting in concentrated network capacity in either the northern or southern hemisphere. For co-positioned satellites (171–174), orbit perturbations are introduced in order to eliminate crosslink blockage caused by intervening satellites (172, 173). Methods for deploying and operating the geosynchronous satellite system enable network capacity to be modified (708) and routing (804), crosslinks (1008), and handoffs (908) to be controlled.

5 Claims, 7 Drawing Sheets

GEOSYNCHRONOUS SATELLITE COMMUNICATION SYSTEM AND METHOD

FIELD OF THE INVENTION

The present invention relates generally to satellite systems and, more particularly, to satellite communication systems using geosynchronous satellites.

BACKGROUND OF THE INVENTION

International regulations govern the placement and station keeping for geosynchronous satellites. These regulations require the ground path of a geosynchronous satellite to intersect the equator only within a tolerance window, or "orbital slot", which is allocated to the satellite. Typically, each orbital slot is centered over a specified longitude and is defined about the central position by ±0.05 degrees to ±0.1 degrees of longitude. Orbital slots currently are separated by minimums specified by their operations frequency band. For example, in the Ka band, orbital slots currently are centered at every two degrees of longitude (i.e., 180 slots exist around the earth). This separation helps to ensure that signals emitted from satellites located in adjacent orbital slots will not significantly interfere with each other.

The finite availability of orbital slots encourages satellite designers to design geosynchronous satellites having the largest possible data-carrying capacity. The capacity of a geosynchronous satellite is typically proportional to the size of the satellite and is limited by the state of current technology. Large, prior art geosyncnronous satellites are expensive to build and place in orbit. Because of the expense, it is not typically feasible to frequently replace geosynchronous satellites which have too little traffic-carrying capacity due to inadequate size and/or outdated technology.

In some prior art systems, multiple geostationary satellites are placed within a single orbital slot in order to increase the traffic carrying capacity of the system within that slot. This is referred to as co-positioning or co-location. For example, multiple geostationary Astra satellites are operated within an orbital slot centered at 19.2 degrees east. U.S. Pat. No. 5,506,780 (Montenbruck, et al.) also discloses a geostationary satellite system which includes multiple, co-located satellites. As used herein, two co-positioned satellites are considered "adjacent" to each other if no other satellites are located between the two satellites. Thus, two satellites are "non-adjacent" when another satellite is located between the two satellites. A satellite located between two co-positioned satellites is referred to herein as an "intervening" satellite.

In order for communication to occur between two ground communication devices which are located within non-overlapping coverage areas of different geostationary satellites, signals must be sent up to the first satellite, then down to a ground station in view of both satellites, then up to the second satellite, and finally down to the other device. The up-down path from a single satellite is called a "bent pipe".

The use of bent-pipe links lead to large signal delays due to the distance between the satellites and ground communication equipment. Because of the large distance between a geostationary satellite and the surface of the earth, a radio signal emitted from a near-equatorial point on the earth incurs a time delay of approximately 120 milliseconds (ms). In prior art systems, the radio signal is translated to another portion of the spectrum (i.e., to avoid interference) and transmitted to the signal's destination. Thus, the signal incurs a total delay of at least 240 ms. When a signal has to be transmitted through multiple bent-pipe geostationary links, the delay increases geometrically.

Signals emitted from ground equipment located at higher latitudes incur even longer time delays because the distance between a non-equatorial point and a geostationary satellite is greater than the distance between a near-equatorial point and the equator. Delays inherent in bent-pipe links make direct communication lis between geostationary satellites desirable.

However, narrow-beam, direct links between non-adjacent, co-positioned geostationary satellites are not possible in prior-art systems because intervening satellites would interrupt the line-of-sight between the non-adjacent satellites, thus disrupting the link.

Besides increased time delays, non-equatorial signals also suffer decreased signal quality due to the curvature of the earth, increased atmospheric considerations, and ground obstacles located along the line-of-sight between the equipment and the geostationary satellite. In fact, above a certain latitude, ground equipment is incapable of communicating with prior art geostationary satellites. Basically, the coverage area of a geostationary satellite is relatively fixed to an area around the assigned longitude. This limitation is unfortunate because areas of the highest traffic demand are not coincident with the equator.

What is needed is a method and apparatus which enables the data carrying capacity within a particular geosynchronous orbital slot to be increased relative to demand and in conjunction with state-of-the-art technology. Further needed is a method and apparatus to decrease signal delay for co-positioned geostationary satellites by enabling non-adjacent, co-positioned geostationary satellites to communicate directly with each other without interruption from intervening satellites. Also needed is a method and apparatus for decreasing signal delay while increasing signal quality for ground equipment which is located at high latitudes and which communicates using geosynchronous satellites. Additionally needed is a method and apparatus to increase the coverage area of geosynchronous satellite systems to include ground equipment at high latitudes which are not currently capable of receiving geosyncnronous satellite service. Also needed is a method and apparatus to selectively provide geosynchronous satellite capacity to non-equatorial geographical areas. Further needed is a method and apparatus for providing global communication coverage using geosynchronous satellites.

DETAILED DESCRIPTION OF THE DRAWING

The method and apparatus of the present invention enables the data carrying capacity within a particular geosynchronous orbital slot to be increased relative to demand and in conjunction with state-of-the-art technology. The method and apparatus of the present invention also decreases signal delay for co-positioned geostationary satellites by enabling non-adjacent, co-positioned geostationary satellites to communicate directly with each other without interruption from intervening satellites. The method and apparatus of the present invention also decreases signal delay while increasing signal quality for ground equipment which is located at high latitudes and which communicates using geosynchronous satellites. Additionally, the method and apparatus of the present invention increases the coverage area of geosynchronous satellite systems to include ground equipment at high latitudes which are not currently capable of receiving geostationary satellite service. Also, the method and apparatus of the present invention selectively provides geosynchronous satellite capacity to non-equatorial geographical areas. In addition, the method and apparatus of the present invention provides global communication coverage using geosynchronous satellites.

The method and apparatus of the present invention will be described in detail below. Briefly, the above-listed advantages of the present invention are achieved by co-locating multiple geosynchronous satellites along a common ground path and providing crosslinks between the satellites. Crosslinks between geosynchronous satellites provides the system with networking capability between satellites and reduces signal delays. In addition, the data carrying capacity of a network can be increased relative to demand by deploying additional satellites along the common ground path.

Advantages are also achieved by providing crosslinks between co-positioned geostationary satellites which may be maintained without interruption from intervening satellites by intentionally introducing small perturbations into the orbits of select, co-positioned satellites.

For ground equipment located at high latitudes, signal delay is decreased by providing multiple geosynchronous satellites having orbits which are inclined to the equator. This causes each satellite to reach higher latitudes within its ground path, thus decreasing the distance to high latitude equipment. In addition, the inclined orbits enable the geosynchronous satellites to provide service to ground equipment at latitudes which were not capable of obtaining service from prior-art systems. Increased network capacity can be adjusted in non-equatorial regions (i.e., either the northern or southern hemisphere) by making the inclined orbits eccentric. Global coverage is achieved by linking multi-satellite geosynchronous networks together which are located in different orbital slots.

Figure 1:
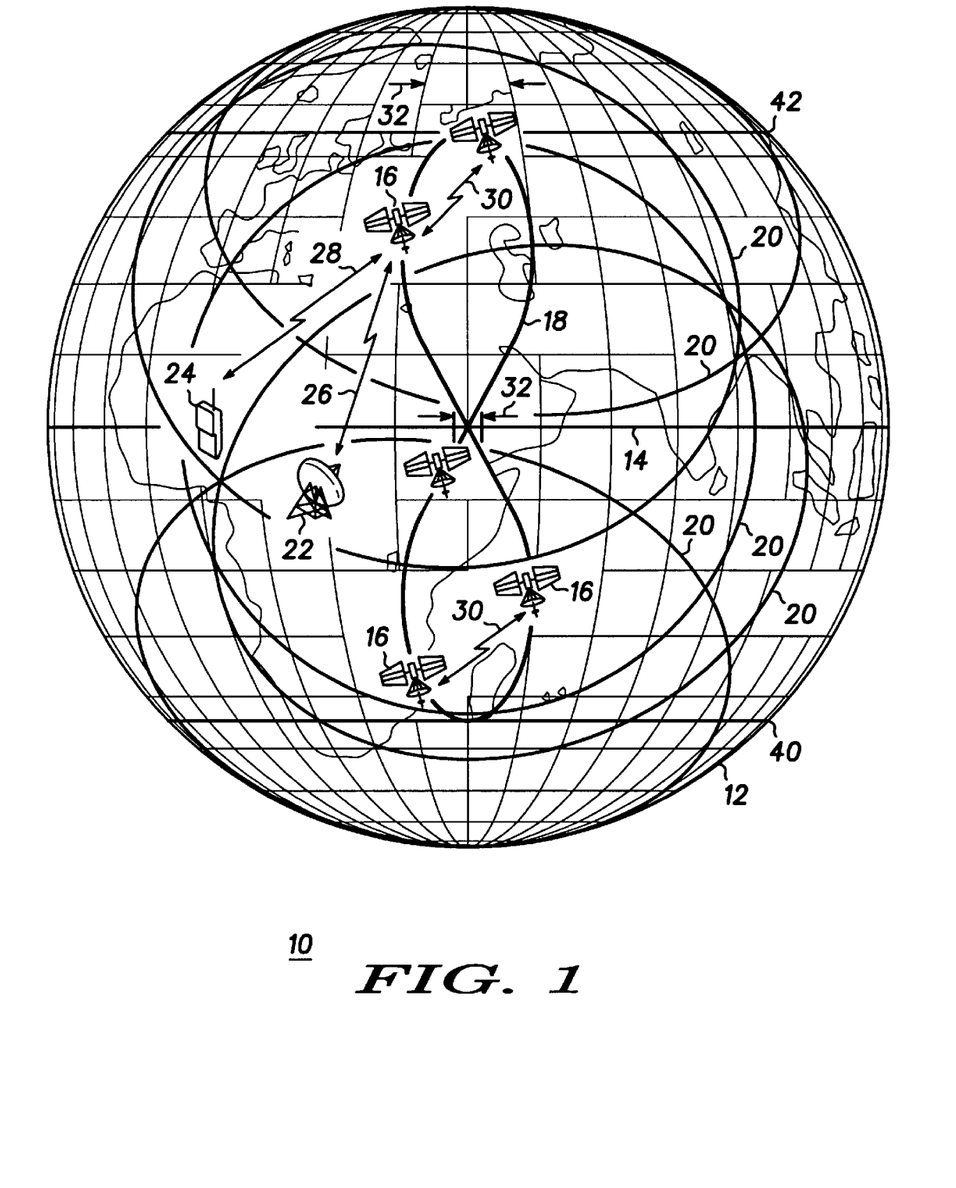
FIG. 1 illustrates a geosynchronous satellite network employing multiple satellites in inclined orbits in accordance with a preferred embodiment of the present invention.

FIG. 1 illustrates geosynchronous satellite network 10 employing multiple satellites 16 in accordance with a preferred embodiment of the present invention. Network 10 includes satellites 16 which orbit earth 12 in a manner such that the ground path 18 of satellites 16 is symmetrical about equator 14.

Satellites 16 are geosynchronous satellites whose ground path 18 intersects the equator within a common orbital slot 32. In a preferred embodiment, satellites 16 have angles of inclination which are greater than a nominal value (e.g., less than a few degrees) so that satellites 16 can attain latitudes which are significantly higher than those attained by prior-art geostationary satellites. By using such an inclined orbit, the geosynchronous satellite will move into and out of communication range of higher latitude locations on the earth's surface. FIG. 1 illustrates that the ground path 18 of satellites 16 can attain latitudes within a range of latitudes 40 to 42.

In a preferred embodiment, the orbits for each satellite 16 are inclined at the same angle. In alternate embodiments, the orbits for satellites 16 could be inclined at different angles, which would result in satellites which follow different ground paths, although each ground path would intersect the equator within the same orbital slot.

In a preferred embodiment, satellites 16 are located in orbits which cause satellites 16 to follow a near identical ground path 18. Satellites 16 are phased in their orbits so that they are distributed at varying points along ground path 18. In one embodiment, satellites 16 are equally phased in their orbits. This means that satellites 16 are phase-separated from each other by a value of 360 degrees divided by the number of satellites 16. With five satellites as shown in FIG. 1, satellites 16 would be phase-separated from each other by 360/5 degrees, or 72 degrees. Thus, the right ascension of the ascending nodes for each satellite 16 would be separated by 72 degrees.

In alternate embodiments, satellites 16 need not be equally phase-separated. For example, when the traffic carrying capacity of network 10 needs to be increased due to increased traffic demand, additional satellites could be deployed in orbits where the additional satellites also have ground path 18. Each additional satellite could be deployed at a phase which put them at any point along ground path 18. There is no physical requirement that satellites 16 be equally phased upon deployment or when additional satellites are added to network 10.

Unequally phased satellites could produce uneven, time-dependent traffic-carrying capacities throughout the communication network. This uneven capacity could be controlled in time so that greater or less capacity is provided at specific local times of day in specific regions. For example, when a new satellite is added to the network which is not equally phased with respect to the other satellites, more capacity is added to the network for areas in range of the point in the ground path where the new satellite is located The location of the new satellite along the ground path could be planned such that the increased capacity is provided to an area having high demand at a particular time of day.

In a preferred embodiment, satellites 16 communicate with each other over crosslinks 30 which can be radio frequency (RF), optical, and or laser links. A crosslink 30 can be established between any two satellites 16 which are located within the same orbital slot and are within communication range of each other. In other preferred embodiments, a "cross-slot" link (not shown) can be established between a satellite 16 located within one orbital slot 32 and a satellite (not shown) located within a different orbital slot (not shown) or located in a non-geosynchronous orbit. Combining crosslinks 30 and cross-slot links enables network 10 to provide global communication coverage. For example, network 10 could be part of a larger, hybrid system which used any combination of geosynchronous and non-geosynchronous satellites linked by crosslinks 30 and cross-slot links.

Each satellite 16 has an associated coverage area 20 within which a satellite 16 is capable of communicating with equipment located on or near the surface of earth 12. Satellites 16 communicate with ground based equipment, such as ground station 22 and communication unit 24 over downlinks 26, 28, respectively. Links 26, 28 can be RF, optical, and/or laser links, for example, and can use the same or different spectral bands.

Ground station 22 can be, for example, a control facility or a switching gateway facility. A control facility would perform network control functions and is described in more detail in conjunction with FIG. 7. A gateway would enable satellites 16 to exchange messages with one or more different networks (not shown) such as, for example, a terrestrial land-line or cellular communication network or another satellite network. A gateway is described in more detail in conjunction with FIG. 8.

Communication unit 24 can be, for example, a cellular telephone, radio, pager, or a data transceiving device (e.g., a video data transceiver) which is capable of simplex and/or duplex communication with satellites 16. Communication unit 24 could use one or more movable antenna dishes to track satellites 16 as is described in conjunction with FIG. 9. Alternatively, communication unit 24 could use an omnidirectional antenna which does not need to track satellites 16.

FIG. 1 shows five satellites 16, although more or fewer satellites can be used, including as few as two satellites, to achieve the advantages of the present invention. In a preferred embodiment, an odd number of satellites are used in network 10 (especially where the number of satellites is small) so that equally-phased satellites 16 do not simultaneously cross the equator. This eliminates the possibility of satellite collisions over the equator. Network 10 could also use an even number of satellites, however, as long as collision avoidance and downlink interference issues were addressed. As few as three satellites have been shown to provide a substantially larger coverage area than is achieved with a single geostationary satellite. A network using five or more geosynchronous satellites has been shown to provide excellent coverage.

Figure 2:
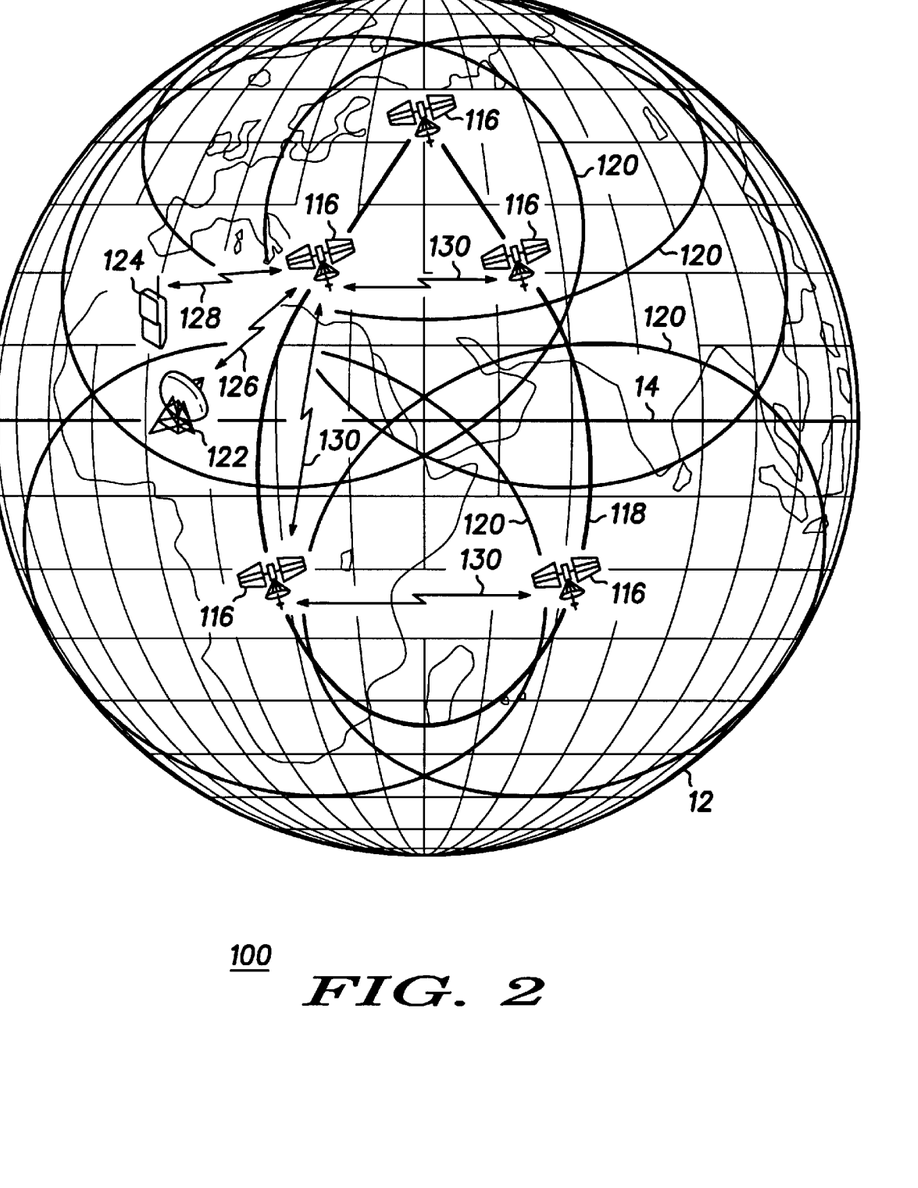
FIG. 2 illustrates a geosynchronous satellite network employing multiple satellites in an inclined, elliptical orbit in accordance with a preferred embodiment of the present invention.

FIG. 2 illustrates geosynchronous satellite network 100 employing multiple satellites 116 in an inclined, elliptical orbit in accordance with a preferred embodiment of the present invention. Network 100 includes satellites 116 which orbit earth 12 in a manner such that the ground path 118 of satellites 116 is asymmetrical about equator 14. FIG. 2 shows five satellites 116, although more or fewer satellites can be used, including as few as two satellites.

In a preferred embodiment, satellites 116 are geosynchronous satellites having angles of inclination which are greater than a nominal value so that satellites 116 can attain latitudes which are significantly higher than those attained by prior-art geostationary satellites. In a preferred embodiment, the orbits for each satellite 116 are inclined at the same angle. In alternate embodiments, the orbits for satellites 116 could be inclined at different angles, which would result in satellites which follow different ground paths.

In a preferred embodiment, satellites 116 are located in orbits which cause satellites 116 to follow a near identical ground path 118. As with the network described in conjunction with FIG. 1, satellites 116 are phased in their orbits so that they are distributed at varying points along ground path 118. Satellites 116 can be equally or unequally phased in their orbits.

Each satellite 116 has an associated coverage area 120 within which a satellite 116 is capable of communicating with equipment located on or near the surface of earth 12. Satellites 116 communicate with ground based equipment, such as ground station 122 and communication unit 124 over downlinks 126, 128, respectively. Links 126, 128 can be RF, optical, and/or laser links, for example, and can use the same or different spectral bands. Ground station 122 and communication unit 124 were described in conjunction with FIG. 1.

Ground path 118 forms a tear drop pattern due to the elliptical nature of the orbits of satellites 116. The shape of ground path 118 enables network 100 to provide more coverage in either the northern or southern hemisphere. As FIG. 2 illustrates, three satellites 116 currently are located at latitudes above equator 14 while two satellites 116 are located at latitudes below equator 14. In addition, satellites 116 located above equator 14 are spatially closer together, causing their coverage areas 120 substantially to overlap. Ground equipment 126, 128 could, therefore, communicate using any of the three satellites 116 located in the northern hemisphere. In geographical areas which are serviced by multiple satellites 116, traffic carrying capacity is increased and more traffic demand can be serviced.

The illustrated configuration enables network 100 to concentrate its traffic carrying capacity in the northern hemisphere. By using elliptical orbits with a different orientation, network 100 could concentrate its traffic carrying capacity in the southern hemisphere.

In a preferred embodiment, satellites 116 communicate with each other over crosslinks 130 which can be RF, optical, and or laser links. A crosslink 130 can be established between any two satellites 116 which follow the same ground path and are within communication range of each other. In other preferred embodiments, a cross-slot link (not shown) can be established between a satellite 116 which follows one ground path 118 and a satellite (not shown) which follows a different ground path, including a satellite in a non-geosynchronous orbit. Network 100 could be part of a larger, hybrid system which used any combination of geosynchronous and non-geosynchronous satellites linked by crosslinks 130 and cross-slot links.

An elliptical geosynchronous satellite orbit has been described in U.S. Pat. No. 4,943,808 (Dulck, et al.). In the Dulck system, a single geosynchronous satellite provides coverage within a substantially triangular coverage area defined by the elliptical orbit. Other satellites can be used to provide coverage in different areas. The Dulck system does not use multiple satellites to cover a particular area, nor does it use crosslinks between satellites. Therefore, the Dulck system is unable to adaptively increase network capacity, nor is it able to decrease signal delays inherent in bent-pipe systems.

Figure 3:
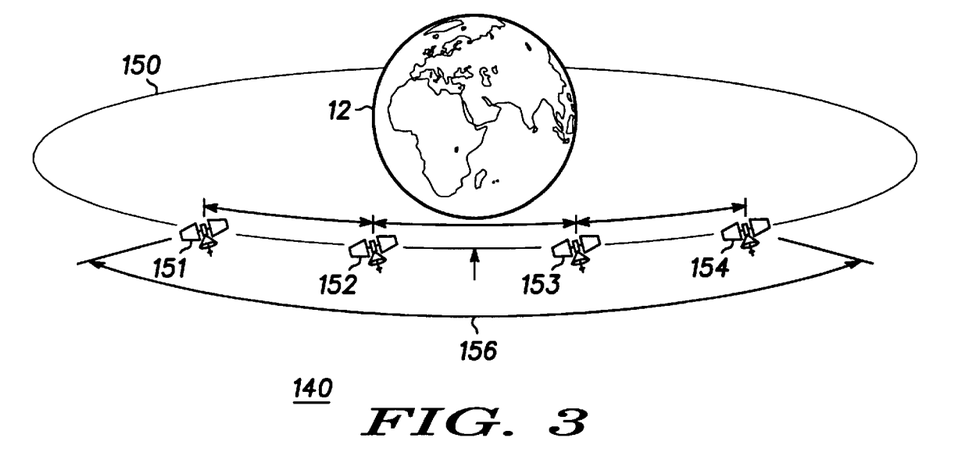
FIG. 3 illustrates a geosynchronous satellite network employing multiple, co-positioned satellites in accordance with a preferred embodiment of the present invention.

FIG. 3 illustrates geosynchronous satellite network 140 employing multiple, co-positioned satellites 151–154 in accordance with a preferred embodiment of the present invention. Satellites 151–154 are dispersed in an orbit 150 around earth 12 and are co-positioned within orbital slot 156 which represents a regulatory tolerance window. Although four satellites 151–154 are shown in FIG. 3, more or fewer satellites could be used, including as few as two satellites.

Because satellites 151–154 must remain within orbital slot 156, the angular distances between satellites 151–154 are very small (e.g., a few hundredths of a degree). Although satellites 151–154 are dispersed along a circular orbit, their proximity to one another makes their orientation very nearly co-linear.

Figure 4:
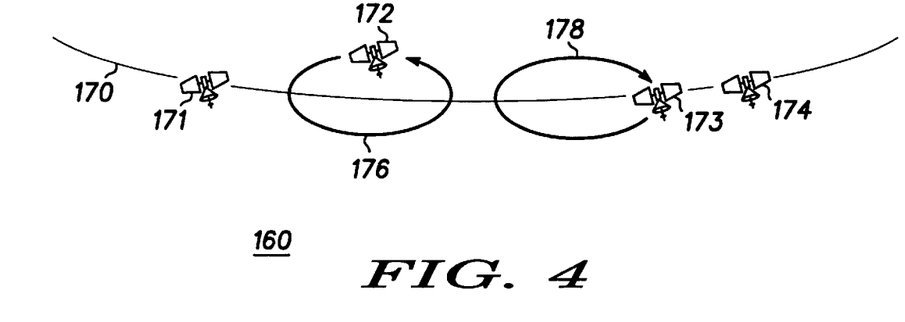
FIG. 4 illustrates a geosynchronous satellite network employing multiple, co-positioned satellites in perturbed orbits in accordance with a preferred embodiment of the present invention.
Figure 5:
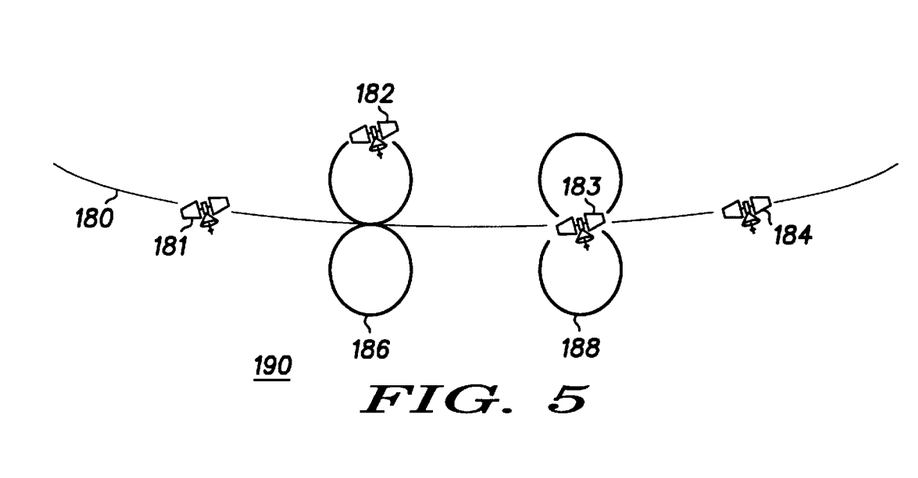
FIG. 5 illustrates a geosynchronous satellite network employing multiple, co-positioned satellites in perturbed orbits in accordance with an alternate embodiment of the present invention.

Crosslinks between adjacent satellites 151–154 enable network 140 to have networking capability and also to decrease delays inherent in bent-pipe links. However, the nearly co-linear orientation of satellites 151–154 causes difficulty in establishing and maintaining crosslinks, especially narrow-band crosslinks, between non-adjacent satellites. For example, if an attempt is made to establish a narrow-band crosslink between non-adjacent satellites 151 and 153, intervening satellite 152 is likely to obstruct the crosslink. FIGS. 4 and 5 illustrate network configurations which overcome the problem of blocked crosslinks between non-adjacent satellites.

FIG. 4 illustrates geosynchronous satellite network 160 employing multiple, co-positioned satellites 171–174 in perturbed orbits in accordance with a preferred embodiment of the present invention. As in FIG. 3, satellites 151–154 are dispersed in orbit 170 around earth and are co-positioned within an orbital slot. However, the orbits of satellites 172 and 173 have been intentionally slightly perturbed in order to eliminate the problem of blocked crosslinks.

Satellite 172 is shown to follow ground path 176 in a counter-clockwise direction 177. Satellite 173 is shown to follow ground path 178 in a clockwise direction 179. When satellites 172 and 173 are properly phased in their orbits, a crosslink between non-adjacent satellites 171 and 173 would not be blocked by intervening satellite 172.

In order to achieve the orbital perturbations shown in FIG. 4, a tiny angle of inclination (e.g., 0.04 degrees) and eccentricity (e.g., 0.00005) were added to the orbits of satellites 172, 173. In addition, the arguments of perigee for satellites 172, 173 were adjusted to values of 270 degrees and 90 degrees in order to achieve counter-rotating, oval ground paths. Finally, a phase shift was induced to displace satellites 172, 173 from each other in their orbits.

In alternate embodiments, different combinations of perturbations could be used to effect the orbits of satellites 172, 173, and/or the perturbations could be applied to satellites other than satellites 172, 173 to achieve the same effect of removing blockage between non-adjacent satellites. For example, perturbations could be applied to satellites 171 and 173 rather than to satellites 172 and 173. The scope of the invention is meant to include different combinations of perturbations and varying numbers of co-positioned satellites.

FIG. 5 illustrates geosynchronous satellite network 190 employing multiple, co-positioned satellites 181–184 in perturd orbits in accordance with an alternate embodiment of the present invention. As in FIG. 3, satellites 181–184 are dispersed in orbit 180 around earth and are co-positioned within an orbital slot. However, the orbits of satellites 182 and 183 have been intentionally slightly perturbed in order to eliminate the problem of blocked crosslinks.

Satellites 182 and 183 are shown to follow ground paths 186 and 188, respectively, which form figure eight patterns. When satellites 182 and 183 are properly phased in their orbits, a crosslink between non-adjacent satellites 181 and 183 would not be blocked by intervening satellite 182.

Similarly to the network shown in FIG. 4, in order to achieve the orbital perturbations shown in FIG. 5, a tiny angle of inclination was added to the orbits of satellites 182, 183. However, ground paths 186, 188 form figure eights rather than ovals because the arguments of perigee for satellites 182, 183 were adjusted to opposite values of 0 degrees and 180 degrees and the eccentricity of the orbits is zero. Finally, a phase shift was induced to displace satellites 182, 183 from each other in their orbits.

In alternate embodiments, different combinations of perturbations could be used to effect the orbits of satellites 182, 183, and/or the perturbations could be applied to satellites other than satellites 182, 183 to achieve the same effect of removing blockage between non-adjacent satellites.

Figure 6:
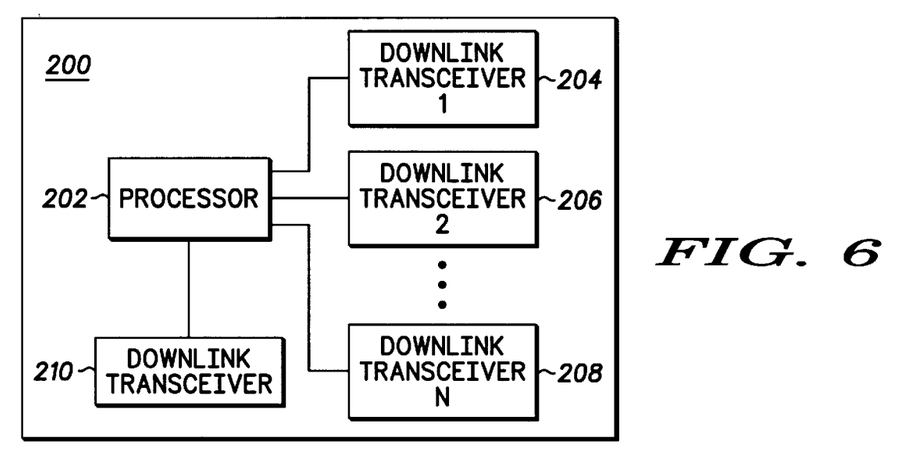
FIG. 6 illustrates a block diagram of a geosynchronous satellite in accordance with a preferred embodiment of the present invention.

FIG. 6 illustrates a block diagram of geosynchronous satellite 200 (e.g., satellites 16, 116, FIGS. 1, 2) in accordance with a preferred embodiment of the present invention. Geosynchronous satellite 200 is used to exchange data between ground equipment and satellites. In a preferred embodiment, geosynchronous satellite 200 includes processor 202 and at least one crosslink transceiver 204, 206, 208. For a geosynchronous satellite which communicates with ground equipment, satellite 200 also includes downlink transceiver 210.

Geosynchronous satellite 200 receives data from at least one other geosynchronous satellite via crosslink transceiver 204, 206, 208. In a preferred embodiment, the other geosynchronous satellites are located along a common ground path (e.g., in a common orbital slot) as satellite 200, although geosynchronous satellite 200 could also maintain cross-slot links with other geosynchronous satellites located along different ground paths or with satellites in non-geosynchronous orbits.

As explained previously, a crosslink can be an RF, optical, or laser communication link between two satellites. In a preferred embodiment, geosynchronous satellite 200 is capable of maintaining multiple crosslinks when multiple other satellites are within communication range, although the advantages to the present invention could be realized if geosynchronous satellite 200 is capable of supporting only a single crosslink with a single crosslink transceiver 204.

Processor 202 is used to control crosslink transceivers 204, 206, 208 and downlink transceiver 210, and also to control the routing of data received over crosslinks and downlinks. The functioning of processor 202 is described in detail in FIG. 12.

In a preferred embodiment, each geosynchronous satellite of a particular network is capable of sustaining at least one downlink via at least one downlink transceiver 210. In alternate embodiments, some geosynchronous satellites could be used only for routing crosslink data, and would not require downlink transceiver 210.

Downlink transceiver 210 is used to exchange data with ground equipment such as, for example, a control facility, switching gateway, or communication unit. Different types of downlink transceivers 210 could be necessary, for example, to communicate with a control facility and to communicate with a communication unit.

Figure 7:
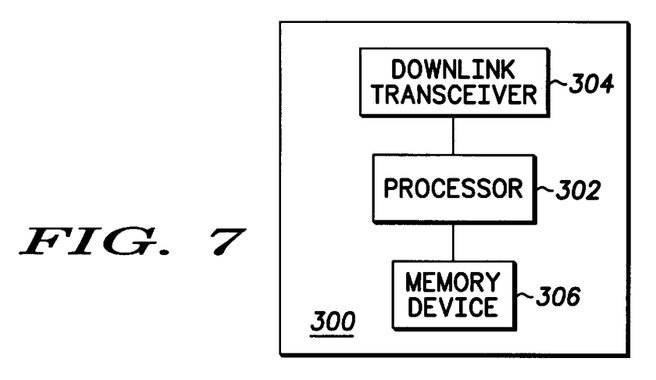
FIG. 7 illustrates a block diagram of a control facility in accordance with a preferred embodiment of the present invention.

FIG. 7 illustrates a block diagram of control facility 300 in accordance with a preferred embodiment of the present invention. Control facility 300 is used to control operations of the geosynchronous satellite network. In a preferred embodiment, control facility 300 includes processor 302 and downlink transceiver 304.

Downlink transceiver 304 is used to send and receive data to and from satellites. Received data could be, for example, telemetry and/or location data which enables control facility 300 to monitor the state of the network. Control facility 300 also sends control information to satellites via downlink transceiver 304.

Control information is created by processor 302. In a preferred embodiment, processor 302 controls the formation of crosslinks by determining link setup times when geosynchronous satellites will be in a communication range, calculating pointing angles of satellite transceivers, and sending control information to the satellites so that the crosslinks can be established at the link setup times. This procedure is described in more detail in conjunction with FIG. 14. In alternate embodiments, some or all of these calculations and control functions can be performed by the satellites rather than by control facility 300.

In a preferred embodiment, control facility 300 also includes memory device 306, although it is not crucial to the present invention. Memory device 306 is desirably used to store information associated with satellites, such as orbital and telemetry data, which are useful for controlling the network.

Figure 8:
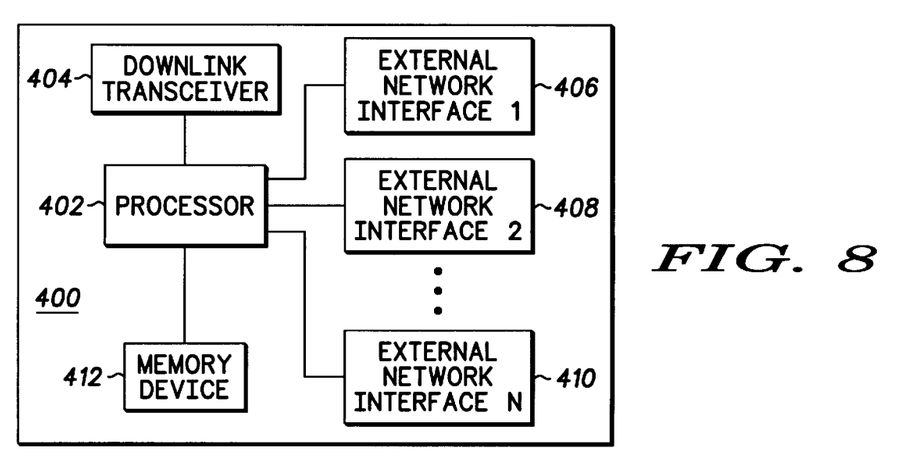
FIG. 8 illustrates a block diagram of a gateway in accordance with a preferred embodiment of the present invention.

FIG. 8 illustrates a block diagram of gateway 400 in accordance with a preferred embodiment of the present invention. Gateway 400 is used as a switching interface between a geosynchronous satellite network and another network. In a preferred embodiment, gateway 400 includes processor 402, downlink transceiver 404, and at least one external network interface 406, 408, 410.

Downlink transceiver 404 is used to send and receive data to and from satellites. Data sent and received by downlink transceiver 404 would typically include traffic-related data, although control data also could be exchanged. Traffic-related data could include, for example voice, data, call setup/teardown information, billing, registration, and telemetry information. Data received from satellites via downlink transceiver 404 is routed by processor 402 to a network interface 406, 408, 410.

Network interfaces 406, 408, 410 interface gateway 400 with other networks such as, for example, terrestrial hardwired, terrestrial cellular, or other satellite networks. Gateway 400 can interface with a single or multiple other networks.

In a preferred embodiment, gateway 400 also includes memory device 412, although it is not crucial to the present invention. Memory device 412 is desirably used to store information associated with system users (e.g., registration, home gateway, and/or billing information) and also information used to perform routing processes.

Figure 9:
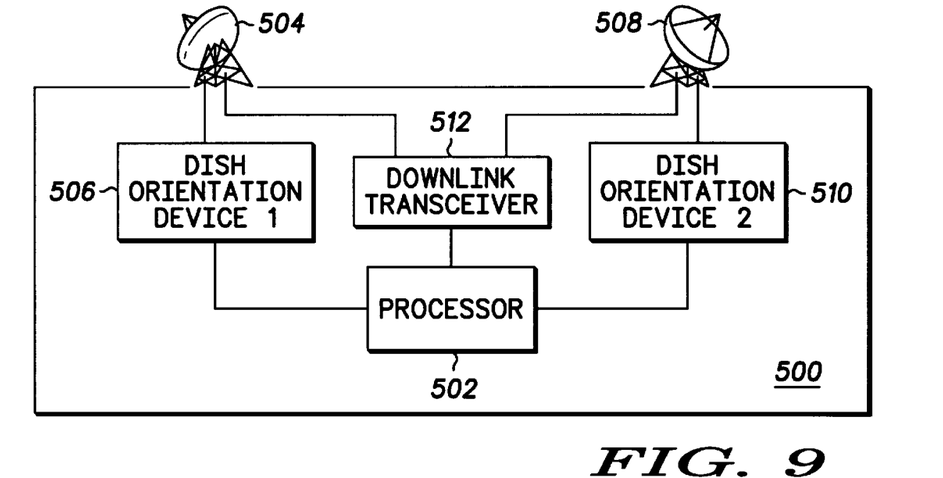
FIG. 9 illustrates a block diagram of a satellite communication device in accordance with a preferred embodiment of the present invention.

FIG. 9 illustrates a block diagram of satellite communication device 500 in accordance with a preferred embodiment of the present invention. Satellite communication device 500 is used to receive information from and send information to a geosynchronous satellite network. In a preferred embodiment, satellite communication device 500 includes at least two satellite dishes 504, 508, at least two dish orientation devices 506, 510, processor 502, and at least one downlink transceiver 512. In alternate embodiments, satellite communication device 500 could have only a single satellite dish 504 and dish orientation device 506, or a single dish orientation device 506 could be used to control the orientation of multiple satellite dishes 504, 508.

Processor 502 is used to control downlink transceiver 512 and dish orientation devices 506, 508. Downlink transceiver 512 receives data packets collected by satellite dishes 504, 508 and sends data packets to satellites via satellite dishes 504, 508.

Satellite communication device 500 can be a duplex device, or a simplex device which is capable of transmitting or receiving signals only. When satellite communication device 500 is a duplex device, downlink transceiver 512 includes a transmitter and a receiver. When satellite communication device 500 is a simplex device which is capable of transmitting only, downlink transceiver 512 includes only a transmitter. Similarly, when satellite communication device 500 is a simplex device which is capable of receiving only, downlink transceiver 512 includes only a receiver.

Satellite dishes 504, 508 include antennas and are used both to collect signals from geosynchronous satellites and to send signals to the geosynchronous satellites. Dish orientation devices 506, 508 are used to orient satellite dishes 504, 508 toward the geosynchronous satellites. As described previously, in a preferred embodiment, the geosynchronous satellites of the network follow ground paths which necessitate reorientation of ground-based, directional receivers.

Multiple satellite dishes 504, 508 are desirable in a preferred embodiment so that satellite communication device 500 can perform a make-before-break handoff between geosynchronous satellites. Satellite dish 504 would establish a link with a first geosynchronous satellite and track that satellite as it moved in its orbit. Eventually, the first geosynchronous satellite could move out of communication range of satellite communication device 500. Before that occurs, satellite communication device 500 desirably can establish another link with a second geosynchronous satellite using satellite dish 506. This handoff procedure is described in more detail in conjunction with FIG. 13.

Figure 10:
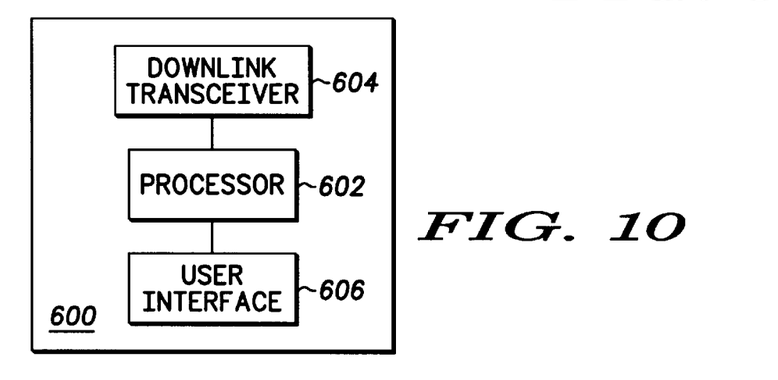
FIG. 10 illustrates a block diagram of a wireless communication unit in accordance with a preferred embodiment of the present invention.

FIG. 10 illustrates a block diagram of wireless communication unit 600 in accordance with a preferred embodiment of the present invention. Communication unit 600 is used to receive information from and send information to a geosynchronous satellite network. In a preferred embodiment, communication unit 600 includes processor 602, downlink transceiver 604, and user interface 606.

Communication unit 600 differs from satellite communication device 500 (FIG. 9) in that communication unit 600 is able, via downlink transceiver 604, to receive signals from and/or send signals to geosynchronous satellites without the use of a satellite dish. Communication unit 600 can be a duplex device, or a simplex device which is capable of transmitting or receiving signals only. When communication unit 600 is a duplex device, downlink transceiver 604 includes a transmitter and a receiver. When communication unit 600 is a simplex device which is capable of transmitting only, downlink transceiver 604 includes only a transmitter. Similarly, when communication unit 600 is a simplex device which is capable of receiving only, downlink transceiver 604 includes only a receiver.

Figure 11:
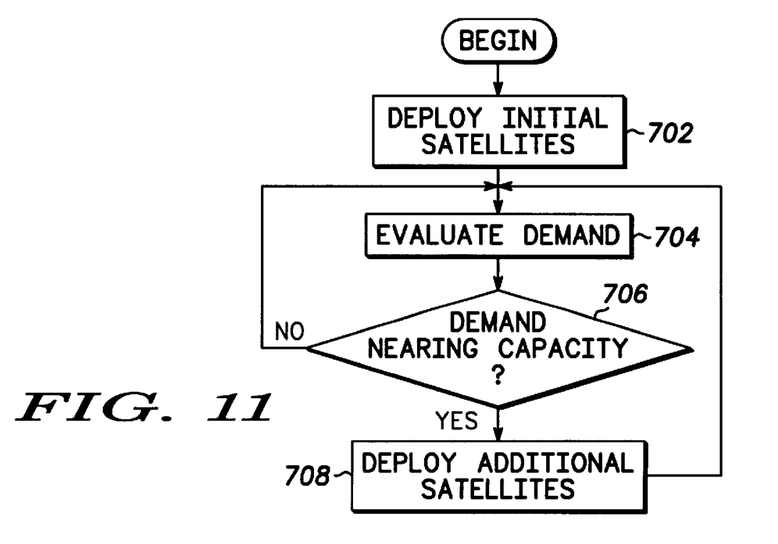
FIG. 11 illustrates a method for deploying a geosynchronous satellite network in accordance with a preferred embodiment of the present invention.

FIG. 11 illustrates a method for deploying a geosynchronous satellite network in accordance with a preferred embodiment of the present invention. The method begins, in step 702, by deploying at least one initial satellite into geosynchronous orbit along a common ground path. The characteristics of the geosynchronous orbit depend on the type of configuration employed by the network. Examples of network configurations have been described in conjunction with FIGS. 1–5.

In step 704, traffic demand is evaluated. The evaluation can be based, for example, on telemetry information received from satellites and/or gateways which indicates the volume of traffic which is being handled by the network.

A determination is made, in step 706, whether the traffic demand is nearing the traffic-carrying capacity of the network (e.g., if the demand is at, near, or has exceeded the capacity). If not, the procedure iterates as shown in FIG. 11.

If the traffic demand has neared traffic-carrying capacity, step 708 is performed, whereby additional satellites are deployed along the common ground path. The additional satellites enable the network to increase its traffic-carrying capacity. The procedure then iterates as shown in FIG. 11.

Figure 12:
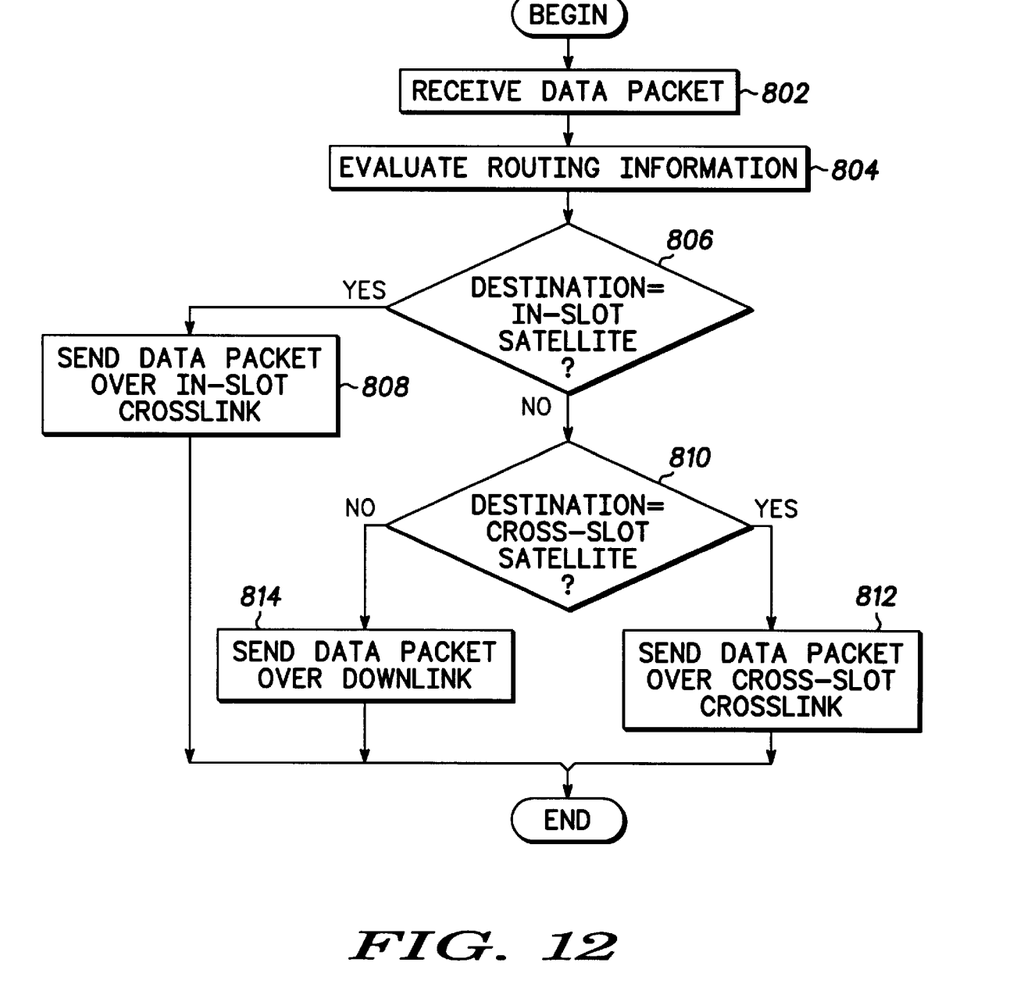
FIG. 12 illustrates a method for routing information through a geosynchronous satellite network in accordance with a preferred embodiment of the present invention.

After deployment, the satellites along the common ground path utilize crosslinks to route data between each other. FIG. 12 illustrates a method for routing information through a geosynchronous satellite network in accordance with a preferred embodiment of the present invention. The method begins, in step 802, when a satellite receives a data packet. In step 804, the satellite evaluates routing information associated with the data packet.

In step 806, a determination is made, based on the routing information, whether the data packet should be routed to a destination satellite which is located along the common ground path. If so, the data packet is sent to the destination satellite over a crosslink between the receiving satellite and the destination satellite.

In a preferred embodiment, if step 806 indicates that the data packet should not be sent to a satellite located along the common orbital path, a determination is made, in step 810, whether the data packet should be routed to a destination satellite which is located along a different orbital path, or to a destination satellite which is non-geosynchronous. If so, the data packet is sent, in step 812, to the destination satellite which is not located along the common ground path. If not, the destination packet is sent, in step 814, over an appropriate downlink to a ground-based destination device. The procedure then ends.

Steps 810 and 812 are performed only when a particular network of geosynchronous satellites (e.g., FIGS. 1–5) is capable of establishing cross-slot links with satellites which are not positioned along the common ground path or within the same orbital slot. If this capability exists, global communication coverage can be achieved using the method and apparatus of the present invention.

For networks having inclined orbits (e.g., FIGS. 1, 2), geosynchronous satellites can travel into and out of communication range of ground-based equipment. Preferably, at least one geosynchronous satellite of the network will be in view of the ground-based equipment at all times. At certain times, it becomes desirable to handoff a communication link with a ground facility from a first geosynchronous satellite to a second geosynchronous satellite.

Figure 13:
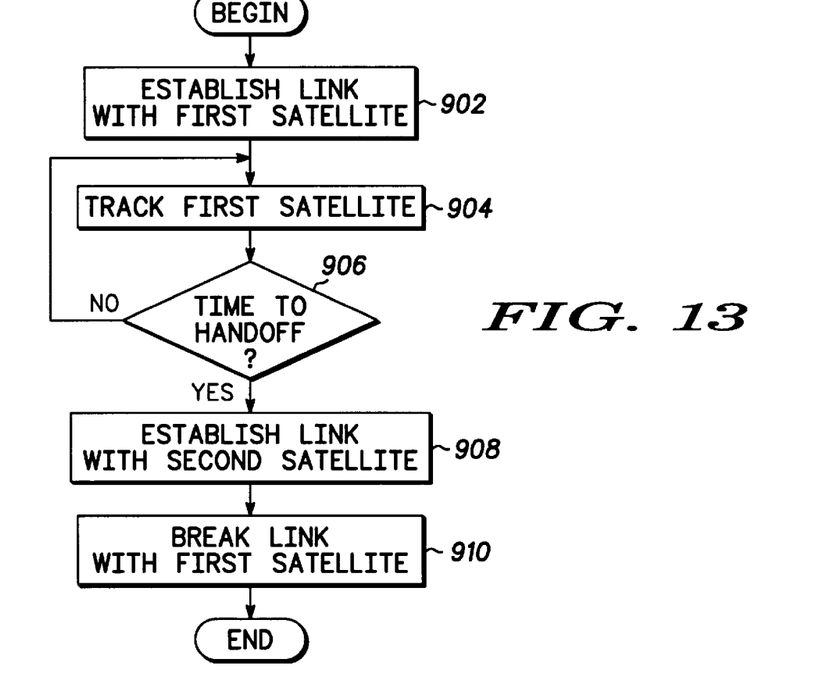
FIG. 13 illustrates a method for handing off a communication unit between inclined geosynchronous satellites in accordance with a preferred embodiment of the present invention.

FIG. 13 illustrates a method for handing off a communication unit between inclined geosynchronous satellites in accordance with a preferred embodiment of the present invention. The method applies to handoffs of links between geosynchronous satellites and any type of ground-based equipment (e.g., a communication unit, gateway, or control facility).

The method begins, in step 902, when a link is established between the communication unit and a first geosynchronous satellite. If necessary, the communication unit tracks the first satellite in step 904 in order to maintain the link by reorienting an antenna toward the first satellite as the first satellite moves in its orbit. Tracking would not be necessary, for example, for a communication unit having an omni-directional antenna A determination is made, in step 906, whether a time to handoff to another geosynchronous satellite has or will soon arrived. A time to handoff could arrive, for example, when the first satellite is soon to travel out of communication range of the communication unit. Alternatively, a time to handoff could arrive if a capacity of the first satellite is or soon will be exceeded. A communication unit could determine that a time to handoff has arrived by its own calculations or from a message received from some other device (e.g., a gateway or control facility). If a time to handoff has not arrived, the procedure iterates as shown in FIG. 13.

If a time to handoff has arrived, the communication unit establishes a link with a second geosynchronous satellite in step 908. Establishing the second link requires the second geosynchronous satellite to be within communication range of the communication unit. For a communication unit which must track the geosynchronous satellites, establishing the link also requires the communication unit to orient a second antenna toward the second satellite and to acquire the second satellite.

After the second link is established, the communication unit breaks the link with the first satellite in step 910 and the handoff procedure ends. This procedure uses a make-before-break handoff sequence, whereby a second link is established prior to breaking the first link. In alternate embodiments, the communication unit could use a break-before-make handoff sequence or a simultaneous make-break handoff sequence. The particular handoff sequence used is not crucial to the present invention.

Figure 14:
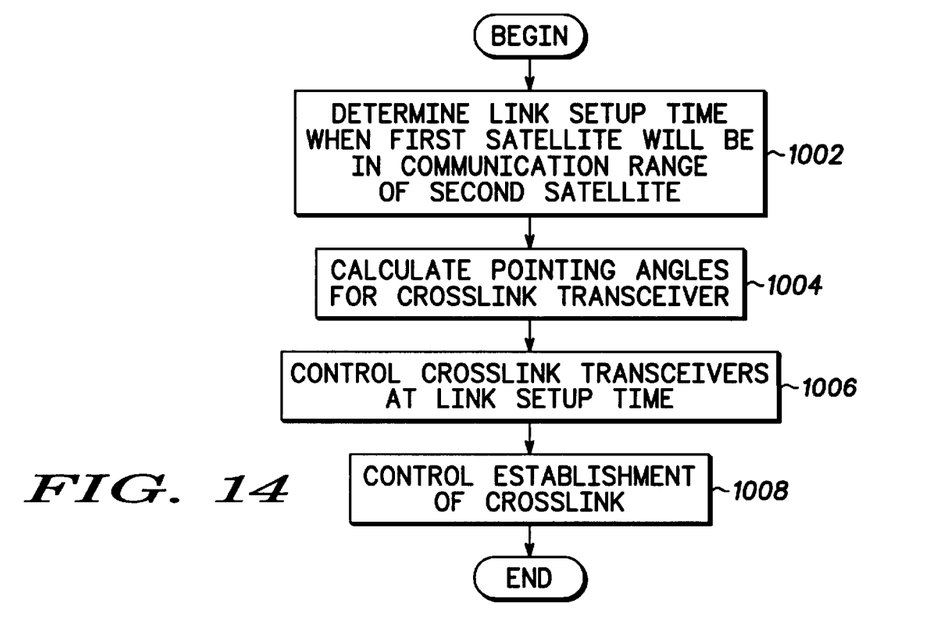
FIG. 14 illustrates a method for establishing crosslinks between satellites of a geosynchronous satellite network in accordance with a preferred embodiment of the present invention.

As explained previously, the apparatus of present invention uses crosslinks between geosynchronous satellites. FIG. 14 illustrates a method for establishing crosslinks between satellites of a geosynchronous satellite network in accordance with a preferred embodiment of the present invention. The method preferably is performed by a control facility. However, some or all steps can be performed by a gateway, satellite, communication unit, or a combination thereof.

The method begins, in step 1002, by determining a link setup time when a first geosynchronous satellite will be in communication range of a second geosynchronous satellite. This can be determined, for example, by evaluating satellite telemetry data and/or by evaluating satellite orbital parameters to calculate the locations of the first and second satellites.

In step 1004, pointing angles for the crosslink transceivers are then calculated for the first and second satellites based on the geometric relationship and orientation of the satellites. The pointing angles indicate where each satellite transceiver should be pointed in order to establish a crosslink at the link setup time.

The crosslink transceivers are then controlled, in step 1006, at the link setup time to point toward the other satellite. If a device other than the first and second satellite controls the pointing of the transceivers, control would be performed indirectly by sending control information to the satellites which enables the satellites to establish the links.

After the crosslink transceivers are appropriately pointed, establishment of the crosslink is controlled in step 1008. Once again, if a device other than the first and second satellite controls the crosslink setup, control would be performed indirectly by sending control information to the satellites. After the crosslink is established, the procedure ends.

In summary, a method and apparatus has been described which uses multiple geosynchronous satellites which use novel orbital configurations and which communicate with each other over crosslinks. The method and apparatus of the present invention has numerous advantages over the prior art and solves problems not addressed in prior art systems.

The present invention has been described above with reference to preferred embodiments. However, those skilled in the art will recognize that changes and modifications may be made in these preferred embodiments without departing from the scope of the present invention. For example, the processes and stages identified herein may be categorized and organized differently than described herein while achieving equivalent results. In addition, communications payloads on board the satellites are extended to include imaging information, navigational information, surveillance information, and any other information derived from the earth-space geometry of the network and the transfer of such information. These and other changes and modifications which are obvious to those skilled in the art are intended to be included within the scope of the present invention.

What is claimed is:

1. A satellite communication network comprising at least three geosynchronous satellites located within a common orbital slot, wherein at least one satellite of the geosynchronous satellites has an angle of inclination which is greater than a nominal value such that the at least one satellite moves into and out of a communication range of at least one location on an earth's surface; and wherein perturbations are applied to orbits of at least two satellites of the at least three satellites, and the perturbations are an increase in an angle of inclination of the orbit of a fraction of a degree, wherein an argument of perigee of the orbits is selected so that ground paths of the at least two satellites appear to rotate in opposite directions.

2. The satellite communication network as claimed in claim 1, wherein the at least three geosynchronous satellites communicate with each other over at least one crosslink between the at least three geosynchronous satellites, and at least one satellite of the at least three geosynchronous satellites communicates with at least one ground device over a downlink between the at least one satellite and the at least one ground device.

3. The satellite communication network as claimed in claim 1, further comprising at least one additional geosynchronous satellite which has an angle of inclination which is not greater than the nominal value.

4. A satellite communication network comprising multiple geosynchronous satellites located within a common orbital slot, wherein the multiple geosynchronous satellites communicate with each other over at least one crosslink between the multiple geosynchronous satellites, and at least one satellite of the multiple geosynchronous satellites communicates with at least one ground device over a downlink between the at least one satellite and the at least one ground device;

wherein the multiple geosynchronous satellites comprise at least three satellites which are located in orbits which are substantially co-linear throughout a period of orbit, and a perturbation is applied to an orbit of at least one satellite of the at least three satellites such that a crosslink between any two of the at least three satellites is not interrupted by a physical blockage of any other one of the at least three satellites; and wherein perturbations are applied to orbits of at least two satellites of the at least three satellites, and the perturbations are an increase in an angle of inclination of the orbit of a fraction of a degree, wherein an argument of perigee of the orbits is selected so that ground paths of the at least two satellites appear to rotate in opposite directions.

5. The satellite communication network as claimed in claim 4, wherein a phase shift is added between the orbits of the at least two satellites.

* * * * *